United States Patent [19]

Rowlette

[11] Patent Number: 4,735,870
[45] Date of Patent: Apr. 5, 1988

[54] LEAD-ACID BATTERY CONSTRUCTION

[75] Inventor: John J. Rowlette, Monrovia, Calif.

[73] Assignee: California Institute of Technology, Pasadena, Calif.

[21] Appl. No.: 855,945

[22] Filed: Apr. 25, 1986

Related U.S. Application Data

[60] Continuation-in-part of Ser. No. 665,655, Oct. 29, 1984, which is a division of Ser. No. 488,199, Apr. 25, 1983, Pat. No. 4,507,372.

[51] Int. Cl.$^4$ ............................................. H01M 10/48
[52] U.S. Cl. ............................................. 429/7; 429/60; 429/61; 429/228
[58] Field of Search ................ 429/1, 7, 59, 60, 61, 429/58, 232, 228, 245

[56] References Cited

U.S. PATENT DOCUMENTS

| | | | |
|---|---|---|---|
| 2,951,106 | 8/1960 | Ruetschi | 429/60 |
| 3,170,819 | 2/1965 | Abramson | 429/60 |
| 4,289,836 | 9/1981 | Lemelson | 429/61 |

FOREIGN PATENT DOCUMENTS

| | | | |
|---|---|---|---|
| 0815797 | 3/1981 | U.S.S.R. | 429/1 |
| 0843035 | 6/1981 | U.S.S.R. | 429/7 |

Primary Examiner—Donald L. Walton
Attorney, Agent, or Firm—Marvin E. Jacobs

[57] ABSTRACT

The power characteristics of a lead-acid battery are improved by incorporating a dispersion of 1 to 10% by weight of a thermodynamically stable conductivity additive, such as conductive tin oxide coated glass fibers (34) of filamentary glass wool (42) in the positive active layer (32) carried on the grid (30) of the positive plate (16). The avoiding of positive plate reversal to prevent reduction of the tin oxide is accomplished by (a) employing an oversized positive plate and pre-charging it; (b) by pre-discharging the negative plate; and/or (c) by placing a circuit breaker (26) in combination with the plates (16, 18) and terminals (22, 24) to remove the load when the voltage of the positive plate falls below a pre-selected level.

13 Claims, 3 Drawing Sheets

LEAD-ACID BATTERY CONSTRUCTION

ORIGIN OF THE INVENTION

This invention described herein was made in the performance of work under a NASA contract and is subject to the provisions of Public Law 96-517 (35 USC 202) in which the Contractor has elected to retain title.

CROSS-REFERENCE TO RELATED APPLICATIONS

This application is a continuation-in-part of copending application Ser. No. 665,655 filed Oct. 29, 1984, which in turn is a division of Ser. No. 488,199, filed Apr. 25, 1983, and issued on Mar. 26, 1985 as U.S. Pat. No. 4,507,372.

TECHNICAL FIELD

The present invention relates to the construction of batteries and, more particularly, to plates for lead-acid batteries having improved conductivity and to the prevention of plate reversal in such batteries.

BACKGROUND ART

Even though there has been considerable study of alternative electrochemical systems, the lead-acid battery is still the battery-of-choice for general purpose uses such as starting a vehicle, boat or airplane engine, emergency lighting, electric vehicle motive power, energy buffer storage for solar-electric energy, and field hardware whether industrial or military. These batteries may be periodically charged from a generator.

The conventional lead-acid battery is a multicell structure. Each cell contains a plurality of vertical positive and negative plates formed of lead-based alloy grids containing layers of electrochemically active pastes. The paste on the positive plate when charged contains lead dioxide which is the positive active material. The negative plates contain a negative active material such as sponge lead. This type of battery has been widely used in the automotive industry for many years; there is substantial experience and tooling in place for manufacturing this type of battery; and, the battery and its components are based on readily available materials, are inexpensive to manufacture, and are widely accepted by consumers.

During discharge, however, the lead dioxide in the positive plate (which is a fairly good conductor) is converted to lead sulfate, which is an insulator. The lead sulfate can form an impervious layer encapsulating the lead dioxide particles, which, in turn, limits the utilization to less than 50% of capacity, typically around 30%.

The power output is significantly influenced by the state-of-discharge of the battery, since the lead sulfate provides a circuit resistance whenever the battery is under load. Furthermore, the lead sulfate can grow into large, hard, angular crystals, disrupting the layer of paste on the grid, resulting in flaking and shedding of active material from the grid. Power consumption during charge is also increased due to the presence of the lead sulfate insulator. The lead sulfate crystals on the negative electrode can grow to a large, hard condition and, due to their insulating characteristics, are difficult to reduce to lead. Even when very thin pastes are utilized, the coating of insulating lead sulfate interferes with power output. Thus, power capability is greatly influenced by the state-of-charge of the battery.

An apparent solution to this problem would be the addition of a conductive filler to the paste. The filler should be thermodynamically stable to the electrochemical environment of the cell, both with respect to oxidation and reduction at the potential experienced during charge and discharge of the cell, and to attack by the acid.

Increasing the conductivity of the positive paste by adding a conductive filler such as graphite has been attempted. Graphite has been used successfully as a conductive filler in other electrochemical cells such as, for example, in the manganese dioxide positive active paste of the common carbon-zinc cell and mixed with the sulfur in sodium-sulfur cells.

Even though graphite is usually a fairly inert material, however, it is oxidized to acetic acid in the aggressive electrochemical environment of the lead-acid cell. The acetate ions combine with the lead ion to form lead acetate, a weak salt which is readily soluble in the sulfuric acid electrolyte. Corrosion to the positive grids is the result, especially those parts of the grid wires uncovered by lead oxide. Highly conductive metals such as copper or silver are not capable of withstanding the high potential and strong acid environment present at the positive plate of a lead-acid battery. A few electrochemically-inert metals such as platinum are reasonably stable; but, the scarcity and high cost of such metals prevent their use in high volume commercial applications such as the lead-acid battery. Platinum would be a poor choice even if it could be afforded because of its low gassing-over potentials.

STATEMENT OF THE INVENTION

An improved lead-acid battery is provided in accordance with the invention in which the positive active material maintains conductivity during both charge and discharge cycles. The power output in the battery of the invention is more uniform since it is less dependent of the state-of-charge of the battery and more nearly approaches theoretical efficiency.

The improved power characteristics are provided by incorporating a material into the paste that is insoluble in the electrolyte, has a conductivity similar to the active material, and is thermodynamically stable with respect to oxidation and reduction when it is subjected to the usual charging and discharging potentials of a lead-acid battery.

A suitable conductivity additive for the positive active paste in accordance with the present invention is tin dioxide ($SnO_2$) which can be predispersed in the paste or added in precursor form. $SnO_2$ can be present as a powder or coated onto a particulate or fibrous substrate such as glass powder or glass wool. Stannic oxide has a conductivity several times that of graphite. $SnO_2$ (doped) has a conductivity of 300 to 400 micro ohm cm vs. 1375 micro ohm cm for graphite.

Stannic oxide is thermodynamically stable to the oxidation/reduction potential in the electrochemical environment of a lead-acid battery, has about the same resistivity as $PbO_2$ when $SnO_2$ is coated onto glass, and refractory or baked type of $SnO_2$ is quite insoluble in sulfuric acid. Unlike $PbO_2$, the stannic oxide conductivity additive will remain unchanged during the course of charge and discharge of the positive plate.

According to one important aspect, provision is made for the prevention of plate reversal. One technique of the present invention utilizes an over-sized positive plate and place a 5 to 10% precharge in the positive plate so that even when the cell is discharged, there is no danger of the positive plate falling into the reduction zone for stannic oxide. A second technique utilizes the placing of a 5 to 10% predischarge in the negative plate. Yet another technique is to incorporate a circuit breaker in combination with the plates and terminals to prevent passage of current between the plates when the positive electrode voltage is below about −0.5 V vs. SCE.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
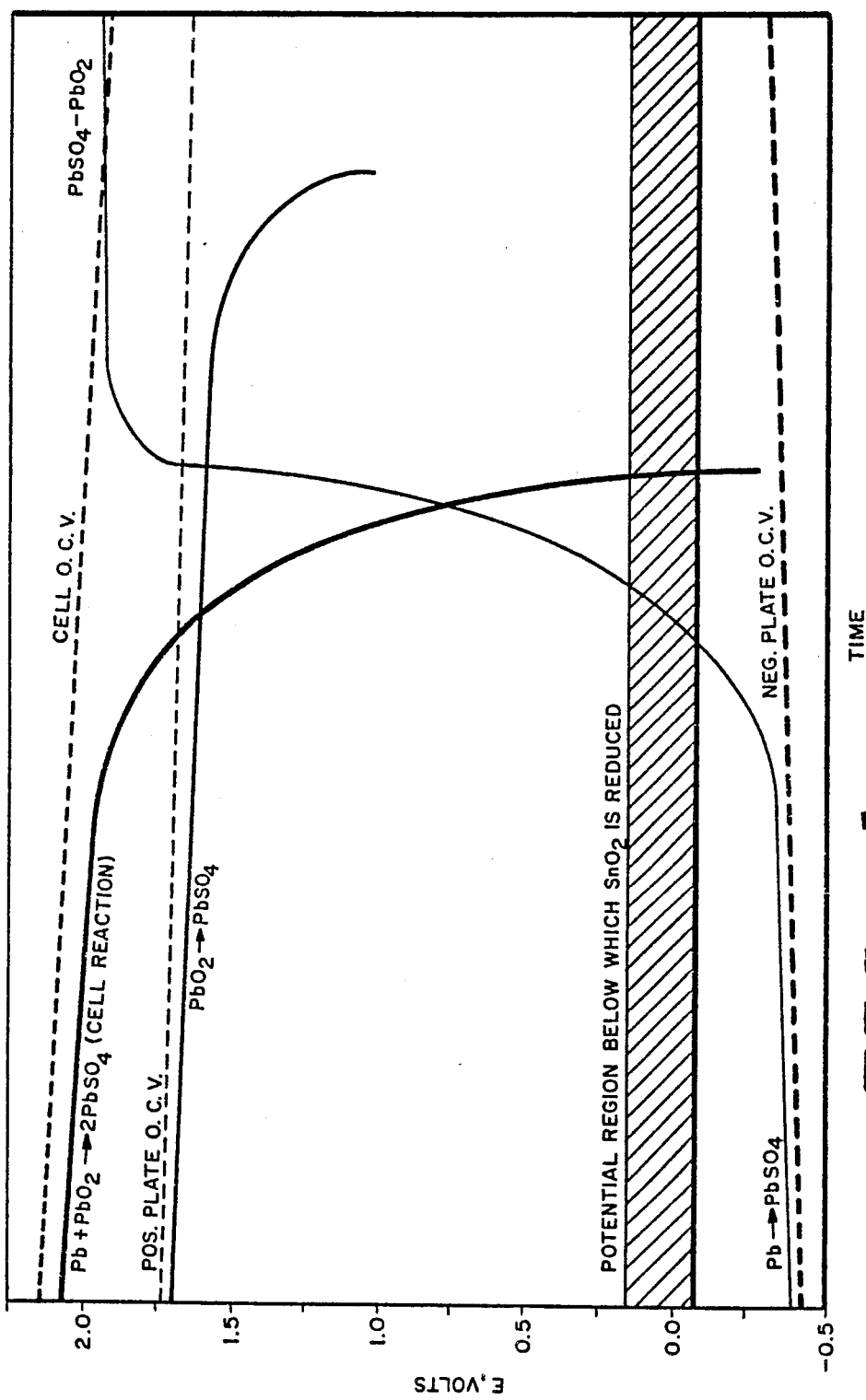
FIG. 1 is a graph of the open circuit voltage (OCV) of a lead-acid cell and of each electrode and of the potential of each electrochemical reaction.

Referring first to FIG. 1, the electrode potentials referred to the standard hydrogen electrode are shown for the open circuit voltages for the cell and of each plate. Also shown are the potentials of various reactions occurring in a lead-acid battery. The potential region below which $SnO_2$ is reduced is shown in the crosshatched region.

Figure 2:
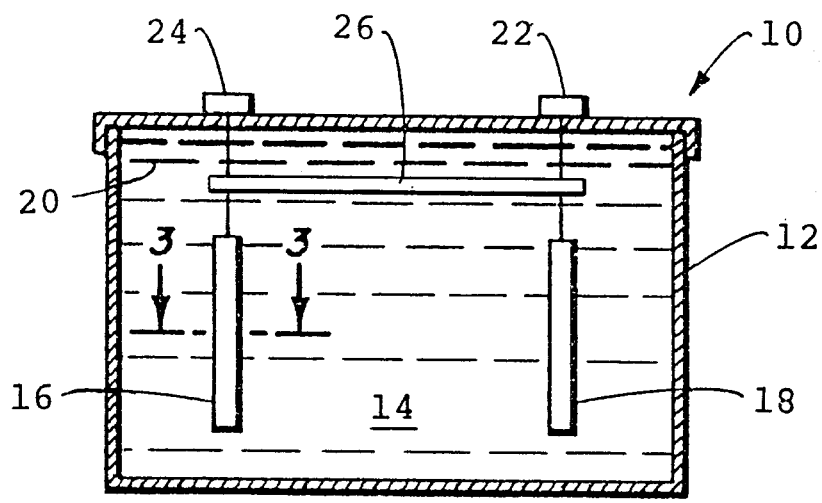
FIG. 2 is a schematic view of a lead-acid cell.

A schematic cell is shown in FIG. 2. The cell 10 is housed in an electrolyte-impervious container 12 forming a cell compartment 14 in which is received a positive plate 16, a negative plate 18, and a body 20 of aqueous sulfuric acid electrolyte. The cell 10 can be connected in parallel or series to other cells, not shown, in the usual manner. The negative plate 18 and positive plate 16 are connected to terminals 22, 24, respectively.

Positive plate reversal to less than about −0.5 V vs. SCE is to be avoided to prevent reduction of the $SnO_2$ to tin. This can be accomplished in several ways contemplated by the present invention. According to one technique of the present invention, one can utilize an over-sized positive plate and place a 5 to 10% precharge in the positive plate so that even when the cell is discharged, there is no danger of the positive plate falling into the reduction zone for stannic oxide. A second technique utilizes the placing of a 5 to 10% predischarge in the negative plate. Yet another technique for preventing cell reversal according to the present invention is to incorporate a circuit breaker 26 in combination with the plates 16, 18 and terminals 22, 24 to prevent passage of current between the plates when the positive electrode voltage is below about −0.5 V vs. SCE. This latter technique will be explored in greater detail later hereinafter.

Figure 3:
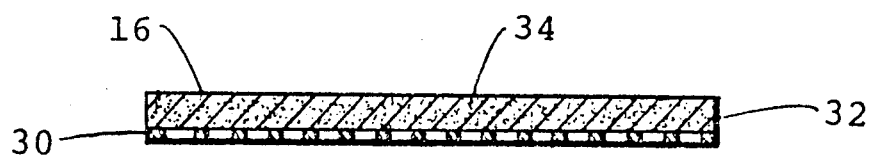
FIG. 3 is a sectional view of a positive plate containing conductive filler taken along line 3—3 of FIG. 2 according to a first embodiment.
Figure 4:
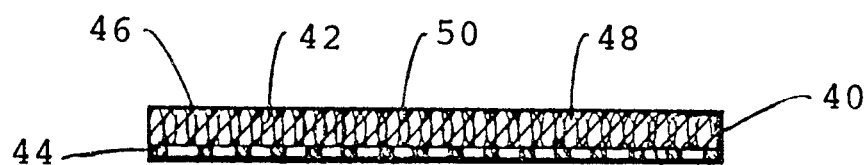
FIG. 4 is a schematic view of a positive plate according to a second embodiment containing a positive active layer in which positive active materials are dispersed in a conductive filamentary wool.

Returning now to the cell construction of FIGS. 2–4, the negative plate 18 is of standard construction and is formed of a high area conductive substrate such as a lead on antimony-lead alloy ladder grid on which is deposited a layer of negative active material such as sponge lead. The negative active material can be formed by reducing a paste of lead oxide or tetra-basic lead sulfate to sponge lead.

Referring to FIG. 3, in a first embodiment, the positive plate 16 can be formed of a conductive ladder grid 30 containing a layer 32 of positive active materials such as lead dioxide in which is dispersed 1 to 10% by weight of conductive tin oxide in particulate form such as random fibers 34. The fibers form a conduction path through the layer 32.

As shown in FIG. 4, in a second embodiment the tin oxide can also be a fine powder in filamentary form or can be coated onto a substrate such as glass in powder or fiber form. Glass wool can be utilized to form the continuous phase for the layer of paste. As shown therein, the positive active layer 40 on grid 44 comprises glass wool 42 containing a conductive coating 46 of stannic oxide. The glass wool 42 is impregnated with a paste 48 of lead dioxide and dried to form the layer 40 which contains a continuous conduction path through the filamentary glass wool 42 from the outside surface 50 facing the electrolyte to the back surface 52 in contact with the grid 44. The stannic oxide coated glass wool 42 can be chopped into roving or short lengths of glass fiber, or powder can be coated with conductive stannic oxide and dispersed in the wet paste before application to the grid.

The coating of stannic oxide onto glass to form a conductive coating was developed over 30 years ago and has been widely practiced to defrost windshields in aircraft and automobiles. The conductive coating is applied to heated glass fibers or powder or glass wool from a solution of stannic chloride in hydrochloric acid as disclosed in U.S. Pat. No. 2,564,707, the disclosure of which is expressly incorporated herein by reference. Other methods have been developed recently and are well known to those skilled in the art and form no part of this invention.

The diameter of the glass fibers is preferably very small such as from 1 to 20 microns. Very fine fibers are too hard to handle and large diameter fibers have too small a surface to provide adequate conductive surface. The fibers contain a conductive coating of stannic oxide from a monolayer in thickness to 10 microns, usually from 0.01 micron to 5 microns.

The following experiments were conducted to evaluate the performance of thin films of stannic oxide in the environment of a lead-acid battery.

EXAMPLE 1

Glass plates were coated with a conductive coating of stannic oxide following the procedure of the example of above-referenced U.S. Pat. No. 2,564,707.

The stannic oxide coated glass plates of Example 1 were immersed in 5.3M $H_2SO_4$ at both 20° C. and 50° C. The plates were withdrawn periodically and the resistance of the thin film coating was measured. The results of measurements during 33 days are shown in Table 1.

TABLE 1

Chemical corrosion of stannic oxide thin film in 5.301 M $H_2SO_4$

| TIME (DAYS) | 50° C. ELECTRODE RESISTANCE $\Omega$(20° C.) | 20° C. ELECTRODE RESISTANCE $\Omega$(20° C.) |
|---|---|---|
| 0 | 10.95 | 10.84 |
| 1 | 10.94 | 10.84 |
| 8 | 10.95 | 10.84 |
| 16 | 10.94 | 10.84 |
| 20 | 10.94 | 10.83 |
| 26 | 10.93 | 10.82 |
| 30 | 10.93 | 10.81 |
| 33 | 10.93 | 10.81 |

During that time at both temperatures listed, the resistance change was less than 1/1000 of the film's original condition (day=0). The two samples described in the table started with different resistance values for the reason that the plates do not have identical dimensions.

Electrochemical corrosion tests were run utilizing a PARC potentiostat, Model 173, to apply a constant potential to either the cathode or anode in the electrochemical cell. This was done by setting the potential of one of the electrodes relative to a saturated calomel reference electrode (SCE). Two tests were run simultaneously in separate cells. One case corresponded to the SOTF used as an anode (positive terminal) with a fixed potential. The counter electrode was a Pt foil. The second case had the SOTF situated as the cathode, again using the Pt foil as the counter electrode.

Shown in Table 2 is the data for ten days of electrochemical tests using SOTF as the anode.

TABLE 2

Potentiostatic corrosion of stannic oxide thin film
Anode potential = 1.058 V vs SCE
Platinum cathode in 5.301 M $H_2SO_4$ at 22° C.

| TIME (DAYS) | RESISTANCE (20° C.) |
|---|---|
| 0 | 8.12 |
| 2 | 8.11 |
| 7 | 8.11 |
| 10 | 8.12 |

With a potential of +1.06 V relative to a calomel electrode, the stannic oxide film did not show a change in resistance within the measurement uncertainty of the experimental apparatus.

The results of using the stannic oxide film as the cathode in the electrochemical cell are shown in Tables 3, 4, and 5.

TABLE 3 iostatic corrosion of stannic oxide thin film
Cathodic potential - 0.695 V vs. SCE
Platinum anode in 5.301 M $H_2SO_4$ at room temperature

| TIME (HRS) | RESISTANCE (20° C.) | $R_T/R_o$ |
|---|---|---|
| 0 | 7.85 | 1.00 |
| ½ | 10.65 | 1.35 |
| 1½ | 16.53 | 2.10 |

TABLE 4

Potentiostatic corrosion of stannic oxide thin film
Cathodic potential - 0.1 V vs. SCE
Platinum anode in 5.301 M $H_2SO_4$ at room temperature

| TIME (HRS) | RESISTANCE $\Omega$(20° C.) | $R_T/R_o$ |
|---|---|---|
| 0 | 7.745 | 1.000 |
| 66 | 7.756 | 1.001 |
| 90 | 7.754 | 1.001 |
| 130 | 7.753 | 1.001 |

TABLE 5

Potentiostatic corrosion of stannic oxide thin film
Cathodic potential - 0.350 V vs. SCE
Platinum anode in 5.301 M $H_2SO_4$ at room temperature

| TIME (HRS) | RESISTANCE $\Omega$(20° C.) | $R_T/R_o$ |
|---|---|---|
| 0 | 7.599 | 1.000 |
| ½ | 7.622 | 1.003 |
| 1 | 7.641 | 1.005 |
| 2 | 7.667 | 1.009 |
| 3 | 7.678 | 1.010 |
| 5 | 7.868 | 1.011 |
| 7 | 7.696 | 1.012 |
| 24 | 7.863 | 1.034 |
| 30 | 7.933 | 1.043 |
| 95 | 9.589 | 1.261 |
| 115 | 9.981 | 1.313 |
| 163 | 10.873 | 1.430 |

It was found that significant deterioration occurs at both −0.70 V and −0.35 V; however, reducing the potential to −0.10 V stopped the electrochemical corrosion. Over a five day period, there was no measurable change in film resistance.

After 33 days of conducting chemical corrosion testing, using electrical resistance as the criteria, less than 1/1000 change was detected in the measurements, i.e., the standard deviation is less than 1/1000. Since the error bar in the measurement may be a maximum 2/1000, a conservative approach to extrapolating the data is to assume an increase of 2/1000 in the film resistance very 30 days. At this rate of degradation, the SOTF (stannic oxide thin film) would take 20 years to double the initial electrical resistance.

The electrochemical corrosion resistance of the SOTF was determined in an electrochemical cell using the SOTF as either the positive or negative electrode and with Pt foil as the counter electrode. The cell was set up with a saturated calomel reference electrode (SCE) which was used to fix the potential of the SOTF electrode. As before, 5.3M sulfuric acid was used and all electrochemical tests were run at 20° C. The SOTF electrode (coated glass plate) was removed periodically from the electrochemical cell and measurements were made of the films. Using the SOTF as the anode (positive electrode with a potential of +1.06 V vs. SCE), less than 1/1000 change in electrical resistance was measured after 10 days of continuous running. Given this limited data, it would take approximately seven years for the SOTF to double the initial resistance value.

Another series of experiments were run using SOTF as the cathode (negative electrode) and Pt foil as the anode at 20° C. In initial runs, where the SOTF potential was set to −1.2 V relative to an SCE reference electrode, resulted in a complete degradation or corrosion of the thin film within a time frame of five to ten minutes. Running the electrochemical cell with SOTF at −0.70 V vs SCE and −0.35 V vs SCE resulted in a significant increase in film electrical resistance with time. For the case of −0.70 V the resistance doubled within a time of one hour, while for 0.35 V, the time for doubling of resistance is estimated to be 14 days. Reducing the SOTF potential further to −0.10 V vs SCE resulted in no noticeable resistance change during five days. Consequently, the threshold potential for degradation of SOTF appears to be between −0.10 V and −0.35 V vs SCE. Polarity reversal below −0.10 V should be avoided. The problem of avoiding polarity reversal according to the present invention will now be addressed once again.

As mentioned earlier herein, particularly when using the construction of the present invention, plate reversal must be avoided to prevent reduction of the $SnO_2$ to $SnSO_4$. This can be accomplished in several ways. One can utilize an oversized positive plate and place a 5 to 10% precharge in the positive plate so that even when discharged, there is no danger of falling into the reduction zone for stannic oxide. A similar approach is the utilization of a negative plate having a 5 to 10% predischarge.

Figure 5:
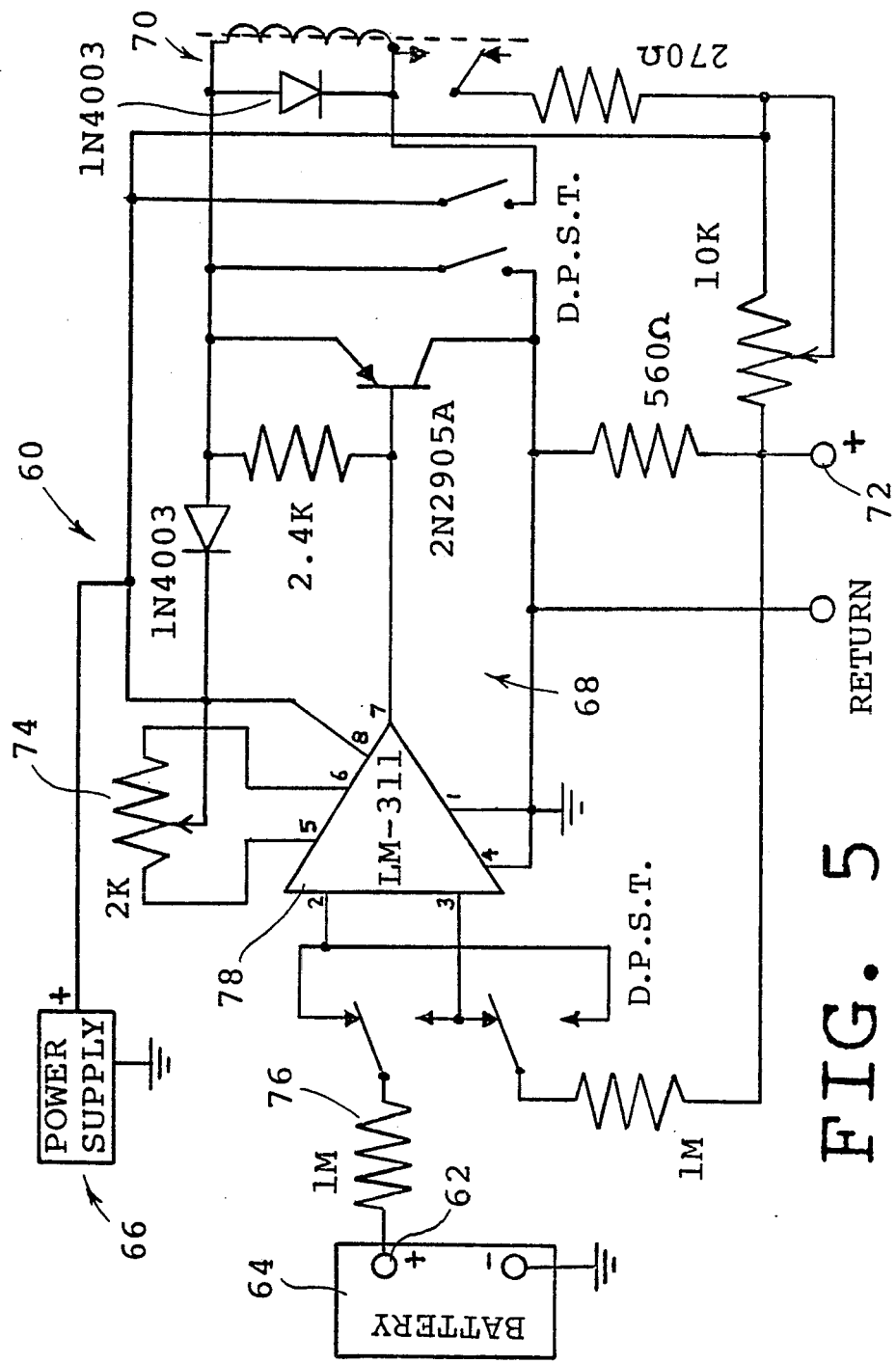
FIG. 5 is a schematic of a circuit of a type that can be employed as part of the present invention to prevent cell reversal.

An aspect of the present invention briefly mentioned earlier herein with respect to FIG. 2 is the incorporation of a circuit breaker type of circuit within the structure of a battery employing cells as described herein in combination with the plates and connecting terminals thereof so as to prevent passage of current between the plates when the positive electrode voltage is below a pre-establish threshold level. The design of such a circuit without undue experimentation is well within the skill of those skilled in the electronics art. By way of example, one circuit that could be employed for this purpose is shown in FIG. 5.

As shown therein, the circuit 60 is placed in series with the positive terminal 62 of the battery 64. Circuit 60, which in this example is powered by power supply 66, comprises a comparator circuit 68 which is used to control the switch 70. Switch 70, in turn, is effectively in series with terminal 72 to which the load is connected and controls the electrical connection between the positive terminal 62 of the battery 64 and the positive terminal 72 to which the load is connected. The threshold level at which cutout is effected to prevent cell plate reversal is set by the variable feedback resistor 74 in combination with the input resistor 76 of the summing amplifier 78. As soon as the voltage of the positive plates of the cells within battery 64 fall below the preselected level, the switch 70 is opened thus disconnecting the load (not shown) from the positive terminal 62 of the battery 64.

It is to be realized that only preferred embodiments of the invention have been described herein and that numerous substitutions, modifications and alterations are permissible without departing from the spirit and scope of the invention as defined in the following claims.

I claim:

1. In a lead-acid battery cell comprising—an electrolyte impervious enclosure receiving a body of liquid acid electrolyte; a first electrode containing negative active lead material immersed in the body of electrolyte; a second electrode immersed in the body of electrolyte and containing positive active lead oxide material having dispersed therein 1 to 10% by weight of particulate additive that is insoluble in the acid electrolyte, having a conductivity similar to the positive active material, and being thermodynamically stable during charge and discharge of the positive active material; a positive and a negative terminal; and, means connecting the electrodes to their respective terminals, the improvement to prevent plate reversal of the electrodes with attendant reduction of the particulate additive comprising:

the positive electrode being an oversized electrode with respect to the size of the negative electrode and being initially in a precharged condition such that a plate reversal state is rendered chemically impossible.

2. In a lead-acid battery cell comprising—an electrolyte impervious enclosure receiving a body of liquid acid electrolyte; a first electrode containing negative active lead material immersed in the body of electrolyte; a second electrode immersed in the body of electrolyte and containing positive active lead oxide material having dispersed therein 1 to 10% by weight of particulate additive that is insoluble in the acid electrolyte, having a conductivity similar to the positive active material, and being thermodynamically stable during charge and discharge of the positive active material; a positive and a negative terminal; and, means connecting the electrodes to their respective terminals, the improvement to prevent plate reversal of the electrodes with attendant reduction of the particulate additive comprising:

the negative electrode being initially in a pre-discharged condition with respect to the positive electrode such that a plate reversal state is rendered chemically impossible.

3. In a lead-acid battery cell comprising—an electrolyte impervious enclosure receiving a body of liquid acid electrolyte; a first electrode containing negative active lead material immersed in the body of electrolyte; a second electrode immersed in the body of electrolyte and containing positive active lead oxide material having dispersed therein 1 to 10% by weight of particulate additive that is insoluble in the acid electrolyte, having a conductivity similar to the positive active material, and being thermodynamically stable during charge and discharge of the positive active material; a positive and a negative terminal; and, means connecting the electrodes to their respective terminals, the improvement to prevent plate reversal of the electrodes with attendant reduction of the particulate additive comprising:

an electrical circuit breaker combined with the battery cell and electrically disposed in the connection between the electrodes and the terminals, said circuit breaker being adapted to sense the voltage on the positive plate and electrically disconnect a load attached thereto from the cell when the voltage on the positive plate drops below a pre-selected level whereby a plate reversal state is rendered impossible.

4. The improvement to a battery cell of claim 3 wherein said electrical circuit breaker is disposed in the connection between the positive electrode and the positive terminal to which a load is electrically connected and comprises:

(a) an electrical connection between the positive electrode and the positive terminal, said electrical connection including switch means in series therewith for breaking and making the electrical connection between the positive electrode and the positive terminal;

(b) sensing means for sensing the voltage on the positive electrode; and, (c) comparison and driver means connected between said sensing means and said switch means for comparing the voltage on the positive electrode to a pre-established value, for closing said switch means to make the connection between the positive electrode and the positive terminal when the voltage on the positive electrode is above said pre-established value, and for opening said switch means to break the connection between the positive electrode and the positive terminal when the voltage on the positive electrode is below said pre-established value.

5. An improved lead-acid battery cell comprising:
(a) an electrolyte impervious enclosure containing a body of liquid acid electrolyte;
(b) a first electrode containing negative active lead material immersed in said body of electrolyte;
(c) a second electrode containing positive active lead oxide material immersed in the body of electrolyte and having dispersed therein 1 to 10% by weight of particulate additive that is insoluble in said acid electrolyte, has a conductivity similar to said positive active material, and is thermodynamically stable during charge and discharge of said positive active material;
(d) a positive terminal;
(e) a negative terminal;
(f) means connecting said electrodes to their respective ones of said terminals; and,
(f) means for preventing plate reversal of said electrodes with attendant reduction of said particulate additive.

6. The battery cell of claim 5 wherein said means for preventing plate reversal comprises:
said positive electrode being an oversized electrode with respect to the size of said negative electrode and being initially in a precharged condition such that a plate reversal state is rendered chemically impossible.

7. The battery cell of claim 5 wherein said means for preventing plate reversal comprises:
said negative electrode being initially in a pre-discharged condition with respect to said positive electrode such that a plate reversal state is rendered chemically impossible.

8. The battery cell of claim 5 wherein said means for preventing plate reversal comprises:
an electrical circuit breaker combined with the battery cell and electrically disposed in said connection between said electrodes and said terminals, said circuit breaker being adapted to sense the voltage on said positive plate and electrically disconnect a load attached thereto from the cell when said voltage on said positive plate drops below a pre-selected level whereby a plate reversal state is rendered impossible.

9. The battery cell of claim 8 wherein said electrical circuit breaker is disposed in said connection between said positive electrode and said positive terminal to which a load is electrically connected and comprises:
(a) an electrical connection between said positive electrode and said positive terminal, said electrical connection including switch means in series therewith for breaking and making said electrical connection between said positive electrode and said positive terminal;
(b) sensing means for sensing the voltage on said positive electrode; and,
(c) comparison and driver means connected between said sensing means and said switch means for comparing said voltage on said positive electrode to a pre-established value, for closing said switch means to make said connection between said positive electrode and said positive terminal when said voltage on said positive electrode is above said pre-established value, and for opening said switch means to break said connection between said positive electrode and said positive terminal when said voltage on said positive electrode is below said pre-established value.

10. A battery cell according to claim 5 in which the particulate additive is glass fibers containing a surface coating of conductive tin oxide.

11. A battery cell according to claim 10 in which the fibers have a diameter from 1 to 20 microns.

12. A battery cell according to claim 10 in which the coating has a thickness from a monolayer tip to about 10 microns.

13. A battery cell according to claim 6 in which the positive electrode is precharged in an amount from about 5 to 10 percent or the negative electrode is predischarged in an amount of about 5 to 10 percent.

* * * * *